US004001604B2

United States Statutory Invention Registration [19]

[11] Reg. Number: H1604

[45] Published: Nov. 5, 1996

Welch et al.

[54] PROCESS FOR CONTINUOUS PRODUCTION OF HIGH DENSITY DETERGENT AGGLOMERATES IN A SINGLE MIXER/DENSIFIER

[76] Inventors: Robert G. Welch; William T. Campbell, both of The Procter & Gamble Company, 5299 Spring Grove Ave., Cincinnati, Ohio 45217-8701

[21] Appl. No.: 83,145

[22] Filed: Jun. 25, 1993

[51] Int. Cl.[6] ..... C11D 1/00

[52] U.S. Cl. ..... 510/441; 510/315; 510/326; 510/349; 510/444

[58] Field of Search ..... 252/89.1, 90, 174.13, 252/174.14, 174.19, 174.21, 174.24

[56] References Cited

U.S. PATENT DOCUMENTS

| | | | |
|---|---|---|---|
| 3,304,355 | 2/1967 | Pobst, Jr. et al. | 264/117 |
| 4,372,868 | 2/1983 | Saran et al. | 252/102 |
| 4,587,031 | 5/1986 | Kruse et al. | 252/135 |
| 4,637,891 | 1/1987 | Delwel et al. | 252/135 |
| 4,726,908 | 2/1988 | Kruse et al. | 252/91 |
| 4,828,721 | 5/1989 | Bollier et al. | 252/8.7 |
| 4,846,409 | 7/1989 | Kaspar et al. | 241/21 |
| 4,869,843 | 9/1989 | Saito et al. | 252/135 |
| 4,923,628 | 5/1990 | Appel et al. | 252/135 |
| 5,018,671 | 5/1991 | Tanimoto et al. | 241/16 |
| 5,043,090 | 8/1991 | Camp et al. | 252/106 |
| 5,080,848 | 1/1992 | Strauss et al. | 264/117 |
| 5,108,646 | 4/1992 | Beerse et al. | 252/174.25 |
| 5,133,924 | 7/1992 | Appel et al. | 264/342 |
| 5,149,455 | 9/1992 | Jacobs et al. | 252/174.13 |
| 5,160,657 | 11/1992 | Bortolotti et al. | 252/174.14 |
| 5,164,108 | 11/1992 | Appel et al. | 252/174 |
| 5,178,798 | 1/1993 | Jolicoeur | 252/553 |
| 5,205,958 | 4/1993 | Swatling et al. | 252/174.13 |

FOREIGN PATENT DOCUMENTS

| | | | |
|---|---|---|---|
| 0 219 328 A2 | 4/1987 | European Pat. Off. | C11D 11/02 |
| 0 229 671 A2 | 7/1987 | European Pat. Off. | C11D 17/00 |
| 0 351 937 A1 | 1/1990 | European Pat. Off. | C11D 11/00 |
| 0 349 201 A2 | 1/1990 | European Pat. Off. | C11D 11/00 |
| 0 451 894 A1 | 10/1991 | European Pat. Off. | C11D 10/04 |
| 0 483 413 A1 | 5/1992 | European Pat. Off. | C11D 1/28 |
| 0 506 184 A1 | 9/1992 | European Pat. Off. | C11D 11/04 |
| 61-69900 | 4/1986 | Japan . | |
| 1 453 697 | 10/1976 | United Kingdom | B01J 2/14 |
| 1 517 713 | 7/1978 | United Kingdom | C11D 17/06 |
| 2 221 695 | 2/1990 | United Kingdom | C11D 11/00 |

*Primary Examiner*—Charles T. Jordan
*Assistant Examiner*—John R. Hardee

[57] ABSTRACT

A process for preparing high density detergent agglomerates having a density of at least 650 g/l is provided. The process comprises the step of continuously mixing detergent granules having a density of less than about 450 g/l in a moderate speed mixer/densifier wherein the granules are pulverized and densified to produce agglomerates having a density of at least 650 g/l . The mean residence time of the granules in the moderate speed mixer/densifier is at least about 12 minutes, and preferably from 12 to 15 minutes. The process further includes the step of either spraying a binder or adding a coating agent in the mixer/densifier to facilitate agglomeration of the granules. Thereafter, the agglomerates are dried to obtain the high density granular detergent agglomerates which are ready for packaging as a low dosage detergent.

12 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

PROCESS FOR CONTINUOUS PRODUCTION OF HIGH DENSITY DETERGENT AGGLOMERATES IN A SINGLE MIXER/DENSIFIER

FIELD OF THE INVENTION

The present invention generally relates to a process for producing detergent agglomerates. More particularly, the invention is directed to a continuous process during which high density detergent agglomerates are produced using a single moderate speed mixer/densifier, such as a Lodige KM™ mixer. The process produces free flowing agglomerates having a density of at least 650 g/l and are thus particularly useful in producing low dosage detergent compositions.

BACKGROUND OF THE INVENTION

Recently, there has been considerable interest within the detergent industry for laundry detergents which are "compact" and therefore, have low dosage volumes. To facilitate production of these so-called low dosage detergents, many attempts have been made to produce high bulk density detergents, for example with a density of 600 g/l or higher. The low dosage detergents are currently in high demand as they conserve resources and can be sold in small packages which are more convenient for consumers.

Generally, there are two primary types of processes by which detergent granules or powders can be prepared. The first type of process involves spray-drying an aqueous detergent slurry in a spray-drying tower to produce highly porous detergent granules. In the second type of process, the various detergent components are dry mixed after which they are agglomerated with a binder such as a nonionic surfactant. In both processes, the most important factors which govern the density of the resulting detergent granules are the density of the various starting materials and their respective chemical composition. These parameters, however, can only be varied within a limited range. Thus, a substantial bulk density increase can only be achieved by additional processing steps which lead to densification of the detergent granules.

There have been many attempts in the art for providing processes which increase the density of detergent granules or powders. Particular attention has been given to densification of spray-dried granules by post tower treatment. For example, Johnson et al, British patent No. 1,517,713 (Unilever) disclose a batch process in which spray-dried or granulated detergent powders containing sodium tripolyphosphate and sodium sulfate are densified and spheronized in a Marumefizer®. This apparatus comprises a substantially horizontal, roughened, rotatable table positioned within and at the base of a substantially vertical, smooth walled cylinder. This process, however, is essentially a batch process and is therefore less suitable for the large scale production of detergent powders.

More recently, attempts have been made to provide a continuous processes for increasing the density of detergent granules. Typically, such processes require a first apparatus which pulverizes or grinds the granules and a second apparatus which increases the density of the pulverized granules by agglomeration. These processes, although continuous, require two mixer/densifier apparatus to achieve the desired increase in density, thereby rendering the process more expensive and less efficient.

For example, Curtis, European patent application No. 451,894 (Unilever), discloses a process for preparing high density detergent granules by using two mixers in series. In particular, the starting materials are fed into a high speed mixer/densifier after which the materials are fed into a moderate speed mixer/densifier to increase the bulk density further. Thus, Curtis initially requires a high speed mixer/densifier to pulverize the detergent granules and then a second moderate speed mixer/densfier to increase the density to the desired level.

Appel et al, U.S. Pat. No. 5,133,924 (Lever), disclose a similar process for preparing a high bulk density granular detergent. As with Curtis, Appel et al use a first high speed mixer for pulverizing the detergent granules and then a moderate speed mixer to increase the density of the granules by agglomeration to 650 gl. Moreover, the Appel et al process requires that the detergent granules be deformable, a requirement which renders the process less economical. Thus, the processes disclosed by Curtis and Appel et al require at least two densifier apparatus among other parameters to achieve the desired density level of about 650 g/l .

Jacobs et al, U.S. Pat. No. 5,149,455 (Henkel), disclose a process for increasing the bulk density of detergent granules by using a mixer consisting of an elongated mixing drum substantially cylindrical in shape which is equipped with a rotatable shaft carrying impact tools. The Jacobs et al process, however, achieves an increase in density of only from about 50 to 200 g/l by using a single high speed mixer/densifier with a relatively short residence time (30 seconds or less). Moreover, the Jacobs et al process specifically requires the inclusion of nonionic surfactant in the mixer to achieve the desired density levels.

Hollingsworth et al, European Patent 351,937 (Unilever), disclose a process for preparing high bulk density (650 g/l) detergent granules by using batch mixers such as a Lodige FM™ mixer. The Hollingsworth et al process is only a batch process which does not facilitate large-scale production as currently required. Moreover, the mixers used in the process are operated at high speeds to achieve relatively short residence times (5 to 8 minutes). While the Hollingsworth et al process provides high density detergent granules by way of a high speed, single-mixer batch process, it would be desirable to have a continuous process in which low or moderate speed mixers can be used to decrease operating costs.

Accordingly, despite the above-described disclosures in the art, it would be desirable to have a process for continuously producing high density detergent agglomerates having a density of at least 650 g/l. It would also be desirable for such a process to be more efficient and economical to facilitate large-scale production of low dosage detergents.

SUMMARY OF THE INVENTION

The present invention meets the aforementioned needs in the art by providing a process which continuously produces high density detergent agglomerates having a density of at least 650 g/l in a single moderate speed mixer/densifier which is horizontally positioned to facilitate continuous processing. The process achieves the desired high density detergent agglomerates without unnecessary process parameters, such as deformable starting detergent granules, relatively high operating temperatures, and a plurality of mixer/densifiers, all of which increase manufacturing costs. As used herein, the term "agglonmrates" refers to particles formed by agglomerating more porous detergent granules or particles which typically have a smaller mean particle size than the formed agglomerates. As used herein, the term "pulverizing" is used to indicate a method by which granules are reduced in particle size and is meant to be synonymous with grinding.

In accordance with one aspect of the invention, a process for preparing high density detergent agglomerates is provided. The process for preparing high density detergent agglomerates comprises the steps of: (a) continuously mixing detergent granules having a density of less than about 450 g/l in a moderate speed mixer/densifier wherein the granules are pulverized and densified to produce agglomerates having a density of at least 650 g/l, the mean residence time of the granules in the moderate speed mixer/densifier being at least about 12 minutes; (b) spraying a binder in the moderate speed mixer/densifier to facilitate agglomeration of the granules; and (c) drying the agglomerates to obtain the high density granular detergent agglomerates according to the invention. In a preferred embodiment of the process, the mean residence time is in range from about 12 minutes to about 15 minutes.

Accordingly, it is an object of the present invention to provide a process for continuously producing high density detergent agglomerates with a density of at least 650 g/l in a single low to moderate speed mixer/densifier. It is also an object of the invention to provide such a process which is not limited by unnecessary process parameters, such as deformable detergent granules, operating temperatures, and additional mixer/densifiers so that large-scale production of low dosage detergents is more economical and efficient. These and other objects, features and attendant advantages of the present invention will become apparent to those skilled in the art from a reading of the following detailed description of the preferred embodiment and the appended claims.

DETAILED DESCRIPTION OF THE PREFERRED EMBODIMENT

The present invention is directed to a process which continuously produces high density detergent agglomerates having a density of at least 650 g/l. By using only a single moderate speed mixer/densifier, the process achieves the desired high density detergent agglomerates without unnecessary process parameters, such as deformable detergent granules, high operating temperatures in the mixer/densifier, and the need for more than one mixer/densifier, all of which increase manufacturing costs. Generally, the present process is used in the production of low dosage detergent agglomerates from post-tower detergent granules. By "post-tower" detergent granules, we mean those detergent granules which have been processed through a conventional spray-drying tower.

It should be understood, however, that the present process can be implemented in other applications without departing from the scope of the invention. For example, the process can be used to form detergent agglomerates which are used as an admix in a granular cleaning product. Typically, the admix will comprise agglomerates produced from high surfactant detergent granules according to the process which are then formulated into post-tower detergent granules for purposes of increasing the surfactant levels of the product. In a similar fashion, the present process can be used to produce high content builder detergent agglomerates which can be admixed in granular hard surface cleaners, granular bleaching products or detergent products to increase builder levels in such products.

The process of the invention permits the above-described exemplary processing options by virtue of its independence of operating parameters, such as the physical properties of the incoming detergent granules. Thus, the present process has the ability to achieve the desired increase in density with entering granules which have ambient temperatures (20° C. to 30° C.) and are considered "non-deformable" as described in detail hereinafter.

Single Mixer/Densifier Process

In the first step of the process, detergent granules having a density of less than about 450 g/l are continuously mixed in a moderate speed mixer/densifier wherein the granules are pulverized and densified to produce agglomerates having a density of at least 650 g/l, more preferably from about 700 g/l to about 800 g/l. The nature and composition of the entering or starting detergent granules can vary as described in detail hereinafter. Preferably, the mean residence time of the granules in the low or moderate speed mixer/densifier is at least about 12 minutes, and more preferably, in range from about 12 minutes to about 15 minutes. Most preferably the residence time is about 12 to about 13 minutes. In this way, the density of the entering detergent granules is effectively increased to the desired level by a combination of grinding or pulverizing and agglomeration in a single moderate speed mixer/densifier.

The detergent granules as they enter the moderate speed mixer/densifier will typically have a particle porosity in a range from about 50% to about 70%. After undergoing the process in accordance with the invention, the particle porosity of the resulting agglomerates is preferably in a range from about 5% to about 20%, more preferably at about 10%. As those skilled in the art will readily appreciate, a reduction in porosity of the detergent granules provides an increase in density to which the present process is primarily directed. In addition, an attribute of dense or densified granules and/or agglomerates is the relative particle size. The present process typically provides agglomerates having a mean particle size of from about 400 microns to about 700 microns, and more preferably from about 450 microns to about 500 microns. As used herein, the phrase "mean particle size" refers to individual agglomerates and not individual particles or detergent granules. The combination of the above-referenced porosity and particle size results in agglomerates having density values of 650 g/l and higher. Such a feature is especially useful in the production of low dosage laundry detergents as well as other granular compositions such as dishwashing compositions.

The process preferably comprises the step of spraying a binder in the moderate speed mixer/densifier to facilitate production of the agglomerates. A binder is added for purposes of enhancing agglomeration by providing a "binding" or "sticking" agent for the detergent granules. The binder is preferably selected from the group consisting of water, anionic surfactant, nonionic surfactants, polyethylene glycol, polyacrylates, citric acid and mixtures thereof. Most preferably, the binder is water in an amount up to about 5% by weight of the resulting detergent agglomerates. Other suitable binder materials including those listed herein are described in Beerse et al, U.S. Pat. No. 5,108,646 (Procter & Gamble Co.), the disclosure of which is incorporated herein by reference.

In another step of the present process, the agglomerates are conditioned by either drying or adding a coating agent to improve flowability after they exit the moderate speed mixer/densifier to obtain the high density granular detergent agglomerates produced by the process which are in shippable or packagable form. Those skilled in the art will appreciate that a wide variety of methods may be used to dry as well as cool the exiting agglomerates without departing from the scope of the invention. By way of example, apparatus such as fluidized bed can be used for drying while an airlift can be used for cooling should it be necessary. Since the moderate speed mixer/densifier can be operated at relatively low temperatures (as described in detail hereinafter), the need for cooling apparatus is not required by the present process, which thereby further reduces manufacturing costs of the final product.

The particular moderate speed mixer/densifier used in the present process should include pulverizing or grinding and agglomeration tools so that both techniques can be carried forth simultaneously in a single mixer. To that end, it has been found that the first processing step can be successfully completed, under the process parameters described herein, in a Lodige KM™ 600 mixer. This mixer essentially consists of a horizontal, hollow static cylinder having a centrally mounted rotating shaft around which several plough-shaped blades are attached. Preferably, the shaft rotates at a speed of from about 80 rpm to about 140 rpm. more preferably from about 100 rpm to about 120 rpm. The grinding or pulverizing is accomplished by cutters, generally smaller in size than the rotating shaft, which preferably operate at about 3600 rpm. Other mixers similar in nature which are suitable for use in the process include the Lodige Ploughshare™ mixer and the Drais® KT 160 mixer.

The moderate speed mixer/densifier in the process can be operated in a range from about 30° C. to about 40° C. These temperatures may vary in accordance with the amount of, if any, binder used in the process. If, for example, the detergent granules are transferred directly from the spray drying tower to the moderate speed mixer/densifier, then the present process does not require the step of spraying a binder in the mixer/densifier. Without intending to be limited by theory, it is believed that the energy or heat of the detergent granules exiting the tower typically will be sufficient for agglomeration in accordance with the present process. Those skilled in the art often refer to this as thermal agglomeration.

In accordance with the present process, the moderate speed mixer/densifier preferably imparts a requisite amount of energy to form the desired agglomerates. More particularly, the moderate speed mixer/densifier imparts from about $1\times10^{11}$ erg/kg to about $5\times10^{11}$ erg/kg at a rate of from about $1.4\times10^{8}$ erg/kg-sec to about $6.9\times10^{8}$ erg/kg-sec to form free flowing high density detergent agglomerates. The energy input and rate of input can be determined by calculations from power readings to the moderate speed mixer/densifier with and without granules, residence time of the granules in the mixer/densifier, and the mass of the granules in the mixer/densifier.

Use of higher energy levels and/or rates of energy input will require lower levels of binder or possible lead to overagglomeration of the granules, thereby producing a doughy mass. However, the use of lower energy levels and/or rates of energy input tend to result in fine powders in the form of light, fluffy agglomerates not having the desired physical properties and/or broad particle size distribution. If the agglomerates produced by the present process are used as a component of a granular composition, the actual size of the agglomerates is preferably selected to match the size of the primary component particles of the composition to minimize product segregation.

Unlike attempts in the past, the present process does not require the detergent granules entering the mixer/densifier to be in a deformable state. This deformable state may be induced in a number of ways, for example, by increasing the temperature of the granules above about 45° C. which significantly increases production expenses. The deformability of the detergent granules depends, among other things, on the chemical composition and the temperature of the detergent granules. Consequently, the present process is independent of such factors, thereby increasing its versatility by increasing the number of possible detergent granules for which the process can be used.

Optional Process Steps

As briefly mentioned above, the process may also comprise the step of adding a coating agent or a flow aid in the moderate speed mixer/densifier to enhance free flowability of the detergent agglomerates. While the relative amount of coating agent can vary without departing from the scope of the invention, the coating agent, it is preferable to have the coating agent comprise less than about 6% by weight of the agglomerates. Preferably, the coating agent is selected from the group consisting of aluminosilicate, powdered tripolyphosphate, powdered tetrasodium pyrophosphate, citrate, powdered carbonates such as calcium carbonate, powdered sulfates and mixtures thereof. Other suitable coating agents include sodium aluminosilicate, powdered sodium tripolyphosphate, powdered tetrasodium pyrophosphate, and mixtures thereof.

Another preferred coating agent is a water-soluble crystalline (or amorphous) aluminosilicate ion exchange material. For example, a suitable crystalline material used herein has the formula $$Na_z[(AlO_2)_z/SiO_2)_y]xH_2O$$

wherein z and y are at least about 6, the molar ratio of z to y is from about 1.0 to about 0.5 and x is from about 10 to about 264. Amorphous hydrated aluminosilicate materials useful herein have the empirical formula $$M_z(zAlO_2/ySiO_2)$$

wherein M is sodium, potassium, ammonium or substituted ammonium, z is from about 0.5 to about 2 and y is 1. These materials preferably have an ion exchange capacity of at least about 50 milligram equivalents of calcium carbonate hardness per gram of anhydrous aluminosilicate.

Detergent Granules

The particular starting detergent granules for the process may be prepared by any suitable method, such as spray-drying or dry-mixing, and may comprise materials usually found in detergent compositions. Such conventional detergent materials include detergent surfactants and builders as well as a variety of optional ingredients.

A. Surfactant

The starting detergent granules of the present process can and preferably comprise at least one of the surfactants described herein. Detergent surfactants can be, and preferably are, included herein. They can be selected from anionic, nonionic, zwitterionic, ampholytic and cationic classes and compatible mixtures thereof. Detergent surfactants useful wherein are described in U.S. Pat. No. 3,664,961, Norris, issued May 23, 1972, and in U.S. Pat. No. 3,919,678, Laughlin et al., issued Dec. 30, 1975, both of which are incorporated herein by reference. Useful cationic surfactants also include those described in U.S. Pat. No. 4,222,905, Cockrell, issued Sep. 16, 1980, and in U.S. Pat. No. 4,239,659, Murphy, issued Dec. 16, 1980, both of which are also incorporated herein by reference. Of the surfactants, anionics and nonionics are preferred and anionics are most preferred. The following are representative examples of detergent surfactants useful in the present granules. Water-soluble salts of the higher fatty acids, i.e. "soaps", are useful anionic surfactants in the compositions herein. This includes alkali metal soaps such as the sodium, potassium, ammonium, and alkylolammonium salts of higher fatty acids containing from about 8 to about 24 carbon atoms, and preferably from about 12 to about 18 carbon atoms. Soaps can be made by direct saponification of fats and oils or by the neutralization of free fatty acids. Particularly useful are the sodium and potassium salts of the mixtures of fatty acids derived from coconut oil and tallow, i.e., sodium or potassium tallow and coconut soap. Additional anionic surfactants which suitable for use herein include the water-soluble salts, preferably the alkali metal, ammonium and alkylolammonium salts, of organic sulfuric reaction products having in their molecular structure an alkyl group containing from about 10 to about 20 carbon atoms and a sulfonic acid or sulfuric acid ester group. (Included in the term "alkyl" is the alkyl portion of acyl groups.) Examples of this group of synthetic surfactants are the sodium and potassium alkyl sulfates, especially those obtained by sulfating the higher alcohols ($C_8$–$C_{18}$ carbon atoms) such as those produced by reducing the glycerides of tallow or coconut oil; and the sodium and potassium alkylbenzene sulfonates in which the alkyl group contains from about 9 to about 15 carbon atoms, in straight chain or branched chain configuration, e.g., those of the type described in U.S. Pat. Nos. 2,220,099 and 2,477,383. Especially valuable are linear straight chain alkylbenzene sulfonates in which the average number of carbon atoms in the alkyl group is from about 11 to 13, abbreviated as $C_{11-13}$ LAS.

Other anionic surfactants suitable for use herein are the sodium alkyl glyceryl ether sulfonates, especially those ethers of higher alcohols derived from tallow and coconut oil; sodium coconut oil fatty acid monoglyceride sulfonates and sulfates; sodium or potassium of ethylene oxide per molecule and wherein the alkyl groups contain from about 8 to about 12 carbon atoms; and sodium or potassium salts of alkyl ethylene oxide ether sulfates containing about 1 to about 10 units of ethylene oxide per molecule and wherein the alkyl group contains from about 10 to about 20 carbon atoms.

In addition, suitable anionic surfactants include the water-soluble salts of esters of alpha-sulfonated fatty acids containing from about 6 to 20 carbon atoms in the fatty acid group and from about 1 to 10 carbon atoms in the ester group; water-soluble salts of 2-acyloxyalkane-1-sulfonic acids containing from about 2 to 9 carbon atoms in the acyl group and from about 9 to about 23 carbon atoms in the alkane moiety; water-soluble salts of olefin and paraffin sulfonates containing from about 12 to 20 carbon atoms: and beta-alkyloxy alkane sulfonates containing from about 1 to 3 carbon atoms in the alkyl group and from about 8 to 20 carbon atoms in the alkane moiety.

Preferred anionic surfactants are $C_{10-18}$ linear alkylbenzene sulfonate and $C_{10-18}$ alkyl sulfate. If desired, low moisture (less than about 25% water) alkyl sulfate paste can be the sole ingredient in the doughy mass. Most preferred is a combination of the two. A preferred embodiment of the present invention is wherein the doughy mass comprises from about 20% to about 40% of a mixture of sodium $C_{10-13}$ linear alkylbenzene sulfonate and sodium $C_{12-16}$ alkyl sulfate in a ratio of about 2:1 to 1:2.

Water-soluble nonionic surfactants are also useful in the instant invention. Such nonionic materials include compounds produced by the condensation of alkylene oxide groups (hydrophilic in nature) with an organic hydrophobic compound, which may be aliphatic or alkyl aromatic in nature. The length of the polyoxyalkylene group which is condensed with any particular hydrophobic group can be readily adjusted to yield a water-soluble compound having the desired degree of balance between hydrophilic and hydrophobic elements.

Suitable nonionic surfactants include the polyethylene oxide condensates of alkyl phenols, e.g., the condensation products of alkyl phenols having an alkyl group containing from about 6 to 15 carbon atoms, in either a straight chain or branched chain configuration, with from about 3 to 12 moles of ethylene oxide per mole of alkyl phenol. Included are the water-soluble and water-dispersible condensation products of aliphatic alcohols containing from 8 to 22 carbon atoms, in either straight chain or branched configuration, with from 3 to 12 moles of ethylene oxide per mole of alcohol.

An additional group of nonionics suitable for use herein are semi-polar nonionic surfactants which include water-soluble amine oxides containing one alkyl moiety of from abut 10 to 18 carbon atoms and two moieties selected from the group of alkyl and hydroxyalkyl moieties of from about 1 to about 3 carbon atoms; water-soluble phosphine oxides containing one alkyl moiety of about 10 to 18 carbon atoms and two moieties selected from the group consisting of alkyl groups and hydroxyalkyl groups containing from about 1 to 3 carbon atoms; and water-soluble sulfoxides containing one alkyl moiety of from about 10 to 18 carbon atoms and a moiety selected from the group consisting of alkyl and hydroxyalkyl moieties of from about 1 to 3 carbon atoms.

Preferred nonionic surfactants are of the formula $R^1(OC_2H_4)_nOH$, wherein $R^1$ is a $C_{10}$–$C_{16}$ alkyl group or a $C_8$–$C_{12}$ alkyl phenyl group, and n is from 3 to about 80. Particularly preferred are condensation products of $C_{12}$–$C_{15}$ alcohols with from about 5 to about 20 moles of ethylene oxide per mole of alcohol, e.g., $C_{12}$–$C_{13}$ alcohol condensed with about 6.5 moles of ethylene oxide per mole of alcohol.

Additional suitable nonionic surfactants include polyhydroxy fatty acid amides of the formula

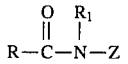

wherein R is a $C_{9-17}$ alkyl or alkenyl, $R_1$ is a methyl group and Z is glycityl derived from a reduced sugar or alkoxylated derivative thereof. Examples are N-methyl N-1-deoxyglucityl cocoamide and N-methyl N-1-deoxyglucityl oleamide. Processes for making polyhydroxy fatty acid amides are known and can be found in Wilson, U.S. Pat. No. 2,965,576 and Schwartz, U.S. Pat. No. 2,703,798, the disclosures of which are incorporated herein by reference.

Ampholytic surfactants include derivatives of aliphatic or aliphatic derivatives of heterocyclic secondary and tertiary amines in which the aliphatic moiety can be straight chain or branched and wherein one of the aliphatic substituents contains from about 8 to 18 carbon atoms and at least one aliphatic substituent contains an anionic water-solubilizing group.

Zwitterionic surfactants include derivatives of aliphatic, quaternary, ammonium, phosphonium, and sulfonium compounds in which one of the aliphatic substituents contains from about 8 to 18 carbon atoms.

Cationic surfactants can also be included in the present invention. Cationic surfactants comprise a wide variety of compounds characterized by one or more organic hydrophobic groups in the cation and generally by a quaternary nitrogen associated with an acid radical. Pentavalent nitrogen ring compounds are also considered quaternary nitrogen compounds. Suitable anions are halides, methyl sulfate and hydroxide. Tertiary amines can have characteristics similar to cationic surfactants at washing solution pH values less than about 8.5. A more complete disclosure of these and other cationic surfactant useful herein can be found in U.S. Pat. No. 4,228,044, Cambre, issued Oct. 14, 1980, incorporated herein by reference.

Cationic surfactant are often used in detergent compositions to provide fabric softening and/or antistatic benefits. Antistatic agents which provide some softening benefit and which are preferred herein are the quaternary ammonium salts described in U.S. Pat. No. 3,936,537, Baskerville, Jr. et al., issued Feb. 3, 1976, the disclosure of which is incorporated herein by reference.

B. Detergent Builder

The starting detergent granules in step (a) of the present process can, and preferably do, also comprise a detergent builder. Builders are generally selected from the various water-soluble, alkali metal, ammonium or substituted ammonium phosphates, polyphosphates, phosphonates, polyphosphonates, carbonates, silicates, borates, polyhydroxy sulfonates, polyacetates, carboxylates, and polycarboxylates. Preferred are the alkali metal, especially sodium, salts of the above. Preferred for use herein are the phosphates, carbonates, silicates, $C_{10-18}$ fatty acids, polycarboxylates, and mixtures thereof. More preferred are sodium tripolyphosphate, tetrasodium pyrophosphate, citrate, tartrate mono- and di-succinates, sodium silicate, and mixtures thereof (see below).

Specific examples of inorganic phosphate builders are sodium and potassium tripolyphosphate, pyrophosphate, polymeric metaphosphate having a degree of polymerization of from about 6 to 21, and orthophosphates. Examples of polyphosphonate builders are the sodium and potassium salts of ethylene diphosphonic acid, the sodium and potassium salts of ethane 1-hydroxy-1, 1-diphosphonic acid and the sodium and potassium salts of ethane, 1,1,2-triphosphonic acid. Other phosphorus builder compounds are disclosed in U.S. Pat. Nos. 3,159,581; 3,213,030; 3,422,021; 3,422,137; 3,400,176 and 3,400,148, all of which are incorporated herein by reference.

Examples of nonphosphorus, inorganic builders are sodium and potassium carbonate, bicarbonate, sesquicarbonate, tetraborate decahydrate, and silicates having a weight ratio of $SiO_2$ to alkali metal oxide of from about 0.5 to about 4.0. preferably from about 1.0 to about 2.4. Water-soluble, nonphosphorus organic builders useful herein include the various alkali metal, ammonium and substituted ammonium polyacetates, carboxylates, polycarboxylates and polyhydroxy sulfonates. Examples of polyacetate and polycarboxylate builders are the sodium, potassium, lithium, ammonium and substituted ammonium salts of ethylene diamine tetraacetic acid, nitrilotriacetic acid, oxydisuccinic acid, mellitic acid, benzene polycarboxylic acids, and citric acid.

Polymeric polycarboxylate builders are set forth in U.S. Pat. No. 3,308,067, Diehi, issued Mar. 7, 1967, the disclosure of which is incorporated herein by reference. Such materials include the water-soluble salts of homo- and copolymers of aliphatic carboxylic acids such as maleic acid, itaconic acid, mesaconic acid, fumaric acid, aconitic acid, citraconic acid and methylenemalonic acid. Some of these materials are useful as the water-soluble anionic polymer as hereinafter described, but only if in intimate admixture with the non-soap anionic surfactant.

Other suitable polycarboxylates for use herein are the polyacetal carboxylates described in U.S. Pat. No. 4,144,226, issued Mar. 13, 1979 to Crutchfield et al, and U.S. Pat. No. 4,246,495, issued Mar. 27, 1979 to Crutchfield et al, both of which are incorporated herein by reference. These polyacetal carboxylates can be prepared by bringing together under polymerization conditions an ester of glyoxylic acid and a polymerization initiator. The resulting polyacetal carboxylate ester is then attached to chemically stable end groups to stabilize the polyacetal carboxylate against rapid depolymerization in alkaline solution, converted to the corresponding salt, and added to a detergent composition. Particularly preferred polycarboxylate builders are the ether carboxylate builder compositions comprising a combination of tartrate monosuccinate and tartrate disuccinate described in U.S. Pat. No. 4,663,071, Bush et al., issued May 5, 1987, the disclosure of which is incorporated herein by reference.

Water-soluble silicate solids represented by the formula $SiO_2.M_2O$, M being an alkali metal, and having a $SiO_2:M_2O$ weight ratio of from about 0.5 to about 4.0, are useful salts in the detergent granules of the invention at levels of from about 2% to about 15% on an anhydrous weight basis, preferably from about 3% to about 8%. Anhydrous or hydrated particulate silicate can be utilized, as well.

C. Optional Detergent Ingredients

The starting or entering detergent granules in the present process can also include any number of additional ingredients. These include other detergency builders, bleaches, bleach activators, suds boosters or suds suppressors, anti-tarnish and anticorrosion agents, soil suspending agents, soil release agents, germicides, pH adjusting agents, non-builder alkalinity sources, chelating agents, smectite clays, enzymes, enzyme-stabilizing agents and perfumes. See U.S. Pat. No. 3,936,537, issued Feb. 3, 1976 to Baskerville, Jr. et al., incorporated herein by reference.

Bleaching agents and activators are described in U.S. Pat. No. 4,412,934, Chung et al., issued Nov. 1, 1983, and in U.S. Pat. No. 4,483,781, Hartman, issued Nov. 20, 1984, both of which are incorporated herein by reference. Chelating agents are also described in U.S. Pat. No. 4,663,071, Bush et al., from Column 17, line 54 through Colmnn 18, line 68, incorporated herein by reference. Suds modifiers are also optional ingredients and are described in U.S. Pat. Nos. 3,933,672, issued Jan. 20, 1976 to Bartoletta et al., and 4,136,045, issued Jan. 23, 1979 to Gault et al., both incorporated herein by reference.

Suitable smectite clays for use herein are described in U.S. Pat. No. 4,762,645, Tucker et al, issued August 9, 1988, Column 6, line 3 through Column 7, line 24, incorporated herein by reference. Suitable additional detergency builders for use herein are enumerated in the Baskerville patent, Column 13, line 54 through Column 16, line 16, and in U.S. Pat. No. 4,663,071, Bush et al, issued May 5, 1987, both incorporated herein by reference.

In order to make the present invention more readily understood, reference is made to the following examples, which are intended to be illustrative only and not intended to be limiting in scope.

EXAMPLE

This Example illustrates the continuous process of the invention. Detergent granules are prepared by spray-drying aqueous slurrys in a conventional spray-drying tower, after which they pass through an airlift. Additional ingredients such as silicates and perborates are subsequently added to the base detergent granules. The composition of the base detergent granules prior to entering the mixer/densifier in accordance with the process is presented in Table I.

TABLE I

| Component | % weight |
|---|---|
| $C_{14-15}$ alkyl sulfate | 12.9 |
| Aluminosilicate | 20.5 |
| Sodium silicate | 0.6 |
| Sodium sulfate | 10.3 |
| Polyacrylate (MW4500) | 3.2 |
| Brightener | 0.3 |
| Sodium carbonate | 23.5 |
| Polyethylene glycol | 1.7 |
| $C_{11-13}$ ethoxylated sulfate (EO3) | 2.3 |
| $C_{11-13}$ linear alkylbenzene sulfate | 12.9 |
| Moisture | 9.8 |
| Miscellaneous | 2 |
| | 100 |

The detergent granules are continuously fed into a Lodige KM™ 600 mixer, a horizontally-positioned moderate speed mixer/densifier, at a rate of 660 kg/hr. The rotational speed of the shaft in the mixer/densifier is about 120 rpm and the rotational speed of the cutters is about 3600 rpm. At the entrance of the mixer/densifier, the temperature of the detergent granules and mixer/densifier is at room temperature, about 21° C., and the porosity is from about 30% to about 50%. In addition, the density of the detergent granules at this point is 450 g/l or less.

While the detergent granules are continuously passed through the mixer/densifier, their mean residence time in the mixer/densifier is about 12–13 minutes. A water binder is continously fed into the mixer/densifier to aid in the agglomeration process. The agglomerates from the mixer/densifier are dried in a conventional fluidized bed dryer after they exit the moderate speed mixer/densifier to obtain the high density granular detergent agglomerates produced by the process. The density of the resulting agglomerates is 800 g/l or higher which is substantially higher than the density of the entering detergent granules. This result is achieved without requiring the detergent granules to be deformable in that their temperature is at room temperature upon entrance into the mixer/densifier. Moreover, only a single mixer/densifier is required to provide the desired increase in density.

Having thus described the invention in detail, it will be obvious to those skilled in the art that various changes may be made without departing from the scope of the invention and the invention is not to be considered limited to what is described in the specification.

What is claimed is:

1. A process for preparing high density detergent agglomerates comprising the steps of:

(a) continuously mixing detergent granules having a density of less than about 450 g/l in a moderate speed mixer/densifier wherein said granules are pulverized and densified to produce agglomerates having a density of at least 650 g/l, the mean residence time of said granules in said moderate speed mixer/densifier being at least about 12 minutes, said moderate speed mixer/densifier imparts from about $1\times10^{11}$ erg/kg to about $5\times10^{11}$ erg/kg at a rate of from about $1.4\times10^{8}$erg/kg-sec to about $6.9\times10^{8}$erg/kg-sec;

(b) spraying a binder in said moderate speed mixer/densifier to facilitate agglomeration of said granules; and (c) drying said agglomerates to obtain said high density granular detergent agglomerates having a density of at least 650 g/l.

2. A process according to claim 1 wherein the mean residence time is in range from about 12 minutes to about 15 minutes.

3. A process according to claim 1 wherein the porosity of said granules is in a range from about 50% to about 70% and the porosity of said agglomerates is in a range from about 5% to about 20%.

4. A process according to claim 1 wherein said binder is water.

5. A process according to claim 1 wherein said binder is selected from the group consisting of water, anionic surfactants, nonionic surfactants, polyethylene glycol, polyacrylates, citric acid and mixtures thereof.

6. A process according to claim 1 wherein the operating temperature of said moderate speed mixer/densifier is in a range from about 30° C. to about 40° C.

7. A process according to claim 1 further comprising the step of adding a coating agent in said moderate speed mixer/densifier to enhance free flowability of said agglomerates.

8. A process according to claim 7 wherein said coating agent comprises less than about 6% by weight of said agglomerates.

9. A process according to claim 1 wherein said detergent granules enter said moderate speed mixer/densifier at a temperature in a range from about 20° C. to about 25° C.

10. A process according to claim 1 wherein said agglomerates have a mean particle size of from about 400 microns to about 700 microns.

11. A process according to claim 1 wherein said moderate speed mixer/densifier comprises a centrally mounted shaft carrying impact tools, said shaft rotating at a speed of from about 100 rpm to about 120 rpm.

12. A process according to claim 1 wherein said moderate speed mixer/densifier comprises a plurality of cutters, each of which rotating at a speed of about 3600 rpm.

* * * * *